United States Patent
Pendharkar et al.

(10) Patent No.: US 7,395,378 B1
(45) Date of Patent: Jul. 1, 2008

(54) SYSTEM AND METHOD FOR UPDATING A COPY-ON-WRITE SNAPSHOT BASED ON A DIRTY REGION LOG

(75) Inventors: Niranjan S. Pendharkar, Pune (IN); Subhojit Roy, Pune (IN)

(73) Assignee: Symantec Operating Corporation, Cupertino, CA (US)

( * ) Notice: Subject to any disclaimer, the term of this patent is extended or adjusted under 35 U.S.C. 154(b) by 200 days.

(21) Appl. No.: 11/029,053

(22) Filed: Jan. 4, 2005

(51) Int. Cl.
*G06F 12/00* (2006.01)
*G06F 13/00* (2006.01)

(52) U.S. Cl. .................. 711/144; 711/100; 711/154

(58) Field of Classification Search ................ 711/144, 711/100, 154, 162, 163, 200; 710/35
See application file for complete search history.

(56) References Cited

U.S. PATENT DOCUMENTS

| | | | | |
|---|---|---|---|---|
| 4,814,971 | A * | 3/1989 | Thatte .................... | 714/15 |
| 6,748,504 | B2 * | 6/2004 | Sawdon et al. ............. | 711/162 |
| 6,993,539 | B2 * | 1/2006 | Federwisch et al. ......... | 707/201 |
| 2003/0005235 | A1 * | 1/2003 | Young ..................... | 711/141 |
| 2004/0143642 | A1 * | 7/2004 | Beckmann et al. .......... | 709/213 |
| 2005/0033878 | A1 * | 2/2005 | Pangal et al. ............... | 710/36 |
| 2005/0193272 | A1 * | 9/2005 | Stager et al. ............... | 714/42 |
| 2005/0278486 | A1 * | 12/2005 | Trika et al. ................ | 711/142 |

OTHER PUBLICATIONS

"Dirty Region Logging (aka: DRL)". The Cuddletech Veritas Volume Manager Series: Advanced Veritas Theory Updated/Created Oct. 5, 2002. Accessed Sep. 8, 2006. http://web.archive.org/web/20021005160814/http://www.cuddletech.com/veritas/advx/x49.html.*

"FastResync (Fast Mirror Resynchronization)". Chapter 3: Volume Manager Operations. VERITAS Volume Manager 3.1 Administrator's Guide. Jun. 2001. pp. 1-5. http://docs.hp.com/en/B7961-90018/ch03s12.html?btnNext=next%A0%BB.*

"Online Backups Using the VxVM Snapshot Facility". Sun BluePritns Online. Sun Microsystems. Sep. 2000. pp. 1-7.*

Brocade, "*Optimizing Fabric Applications With Brocade XPath Technology*," White Paper, Published Feb. 10, 2003, © 2003 Brocade Communications Systems, Inc., 12 pages.

Veritas, "*Veritas Storage Foundation—Technical Overview,*" White Paper, Apr. 2002, © 2002 VERITAS Software Corporation, 37 pages.

Kumar et al., pending U.S. Patent Application entitled "Method and System for Update Tracking Within A Storage Virtualization Device," U.S. Appl. No. 10/882,112, filed Jun. 30, 2004, including Specification: pp. 1-20; Drawings: Figures Figs 1; 2; 3A, 3B on 4 sheets.

* cited by examiner

*Primary Examiner*—Tuan V. Thai
(74) *Attorney, Agent, or Firm*—Campbell Stephenson LLP

(57) ABSTRACT

Various methods and systems for updating a copy-on-write snapshot based on a dirty region log are disclosed. For example, a method involves maintaining a dirty region log and updating a copy-on-write snapshot change tracking map, based on information in the dirty region log. In some embodiments, the copy-on-write snapshot change tracking map is updated in response to an indication of a dirty region log cleaning cycle. The dirty region log cleaning cycle is inhibited until after the copy-on-write snapshot change tracking map has been updated. The method can be used to update multiple copy-on-write snapshot change tracking maps, each of which is associated with a respective one of several copy-on-write snapshots, based on information in the dirty region log. Such a method can be performed by a virtualizing network device.

15 Claims, 5 Drawing Sheets

SYSTEM AND METHOD FOR UPDATING A COPY-ON-WRITE SNAPSHOT BASED ON A DIRTY REGION LOG

FIELD OF THE INVENTION

The present invention relates to data storage and, more particularly, to updating a copy-on-write snapshot.

BACKGROUND OF THE INVENTION

Unplanned events that interfere with the availability of data can seriously impact business operations. Furthermore, any permanent data loss will likely have serious negative consequences for the continued viability of a business. Therefore, when disaster strikes, companies must be prepared to eliminate or minimize data loss and to recover quickly with useable data.

Backups and/or point-in-time copies of data can be maintained in order to decrease the likelihood that data will be lost or unavailable. Several techniques utilized to minimize data loss and improve the availability of data require that modifications to a data volume be tracked. For example, such modifications are often tracked in systems that use "mirror-breakoff" snapshots, in order to allow the snapshots, which are created by detaching a mirror volume, to be resynchronized with a corresponding primary data volume. Similarly, such modifications can be tracked in systems that perform mirroring in order to be able to resynchronize a mirror when the mirror is brought back online after becoming detached from the primary volume due to an I/O error.

Another technique commonly used to improve the accessibility of data and reduce the probability of data loss is storage virtualization. Storage virtualization is the pooling of physical storage from multiple network storage devices into what appears from a user or user application perspective to be a single storage device. Storage virtualization is often used as part of a storage area network (SAN). A virtual storage device appears as one storage device, regardless of the types of storage devices (e.g., hard disk drives, tape drives, or the like) pooled to create the virtualized storage device. Storage virtualization may be performed in a host data processing system, a SAN fabric, or in storage devices directly.

In some conventional systems (e.g., where virtualization is provided in a SAN fabric), virtualization operations are partitioned between specialized hardware (e.g., an application specific integrated circuit or "ASIC" or a proprietary architecture processor, or the like) responsible for the servicing of input/output requests (e.g., the performance of updates) and associated translation between virtual and physical addresses and generalized hardware in combination with software (e.g., a general purpose processor) responsible for establishing the address translation mappings and performing more complex operations.

Tracking modifications to a data volume within such a sectioned storage virtualization system requires a transition between the operation of the aforementioned specialized hardware and generalized hardware/software combination (e.g., to perform additional processing through a "fault" mechanism which causes an interrupt and context switch) and consequently disruption of the ordinary I/O (Input/Output) processing. As update tracking may require a fault or other disruption, the performance of update tracking in a system where virtualization is provided in a SAN fabric may add substantial latency to the performance of operations that modify the underlying data volume.

SUMMARY OF THE INVENTION

Various embodiments of methods and systems for updating a copy-on-write snapshot based on a dirty region log are disclosed. For example, a method involves maintaining a dirty region log and updating a copy-on-write snapshot change tracking map, based on information in the dirty region log. In some embodiments, the copy-on-write snapshot change tracking map is updated in response to an indication of a dirty region log cleaning cycle. The dirty region log cleaning cycle is inhibited until after the copy-on-write snapshot change tracking map has been updated. The method can be used to update multiple copy-on-write snapshot change tracking maps, each of which is associated with a respective one of several copy-on-write snapshots, based on information in the dirty region log. Such a method can be performed by a virtualizing network device.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1:
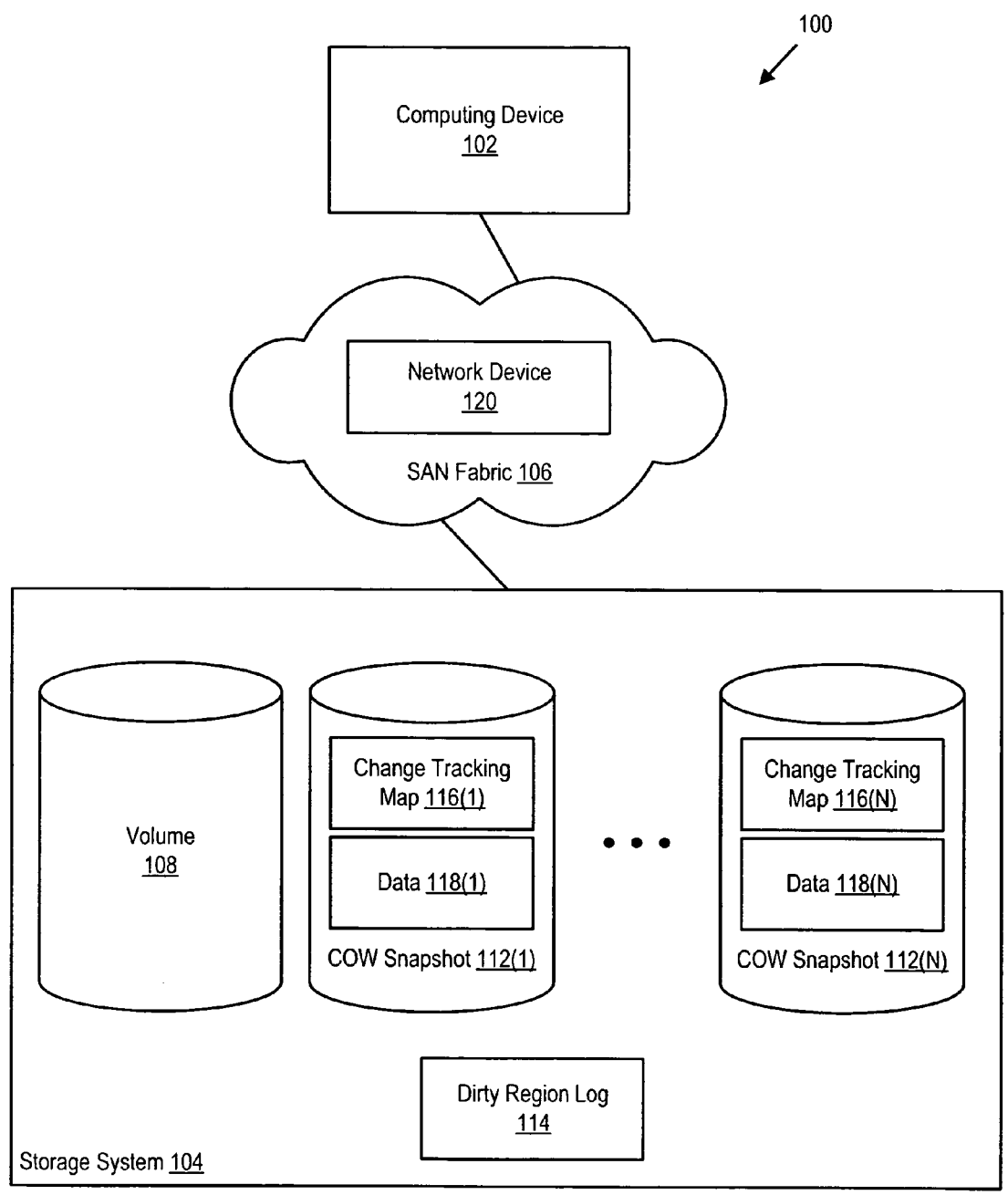
FIG. 1 is a block diagram of a system that maintains a copy-on-write snapshot, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 illustrates a storage area network (SAN). As shown in FIG. 1, a SAN 100 is depicted including a computing device 102 coupled to a storage system 104 via a SAN fabric 106. A SAN is a network that interconnects storage devices with associated computing devices in order to facilitate transfer of data between the storage devices and the computing devices. A SAN also facilitates the transfer of data among storage devices. For example, a SAN can provide a high-speed connection from the storage device to a server, which then accesses the data storage device on behalf of a larger network of clients. Typically, a storage area network is part of the overall network of computing resources for an enterprise.

SAN fabric 106 includes a network device 120. Network device 120 is a network component such as a switch that can interconnect multiple computing devices and storage devices. In the illustrated embodiment, network device 120 performs storage virtualization functions including translation between virtual and physical addresses as well as providing functionality of one or more storage applications (e.g., VERITAS Storage Replicator, VERITAS Volume Replicator, and/or VERITAS Volume Manager, all available from VERITAS Software Corporation of Mountain View, Calif.). A network device that includes storage virtualization functionality is referred to herein as a virtualizing network device.

While virtualization functionality has been illustrated as being embodied within SAN fabric 106 in FIG. 1, storage virtualization functionality can alternatively be provided in whole or in part within another device. For example, storage virtualization functionality can be provided within computing device 102 or within a storage device (e.g., an array controller) associated with and/or included in storage system 104.

Storage system 104 includes one or more persistent storage devices, such as direct access storage devices, hard disks, tape drives, network-attached storage devices, storage arrays (e.g., "Just a Bunch of Disks" (JBOD) arrays or Redundant Array of Independent Disks (RAID) arrays), or the like. In the illustrated example, storage system 104 includes a volume 108, N copy-on-write (COW) snapshots 112(1)-112(N), and a dirty region log 114. A data volume, such as volume 108, includes one or more logical and/or physical storage elements (e.g., physical disks, disk arrays, logical subdisks, plexes, or the like).

Each copy-on-write snapshot 112(1)-112(N) includes a change tracking map and data. For example, copy-on-write snapshot 112(1) includes change tracking map 116(1) and data 118(1), and copy-on-write snapshot 112(N) includes change tracking map 116(N) and data 118(N). Change tracking maps 116(1)-116(N) can each be implemented as a bitmap, log, journal, or the like.

Instead of storing a copy of every region of volume 108, a copy-on-write snapshot only stores the values of regions of volume 108 that have been modified subsequent to the creation of the copy-on-write snapshot. An application reading other regions from the copy-on-write snapshot will be redirected to volume 108. Accordingly, a copy-on-write snapshot is a dependent snapshot in that the snapshot depends on volume 108 to supply at least some of its contents. At the time that a copy-on-write snapshot of volume 108 is created, the change tracking map does not identify any regions of volume 108, and no data is included in the copy-on-write snapshot. If a region of volume 108 is subsequently modified, the original value of that region is first copied to the copy-on-write snapshot and the change tracking map is updated to indicate that the value of that region, at the time the snapshot was created, can now be found within the copy-on-write snapshot instead of on volume 108. Thus, change tracking maps 116(1)-116(N) store information identifying which regions of volume 108 have been modified subsequent to the creation of a respective copy-on-write snapshot.

Dirty region log 114 tracks changes to volume 108. Dirty region log 114 can identify regions of volume 108 that have recently been modified. If volume 108 is a mirrored volume (i.e., if volume 108 includes one or more mirrors, or if another volume is configured as a mirror of volume 108), dirty region log 114 can be used as a mirror recovery map, which identifies regions of volume 108 that need to be synchronized among all of the mirrors. Dirty region log 114 can be implemented as a bitmap, log, journal, or the like.

If volume 108 is mirrored, dirty region log 114 can track the update until the update has been applied to all of the mirrors associated with volume 108. For example, if region A of volume 108 is modified by a write operation, a portion (e.g., a bit) of dirty region log 114 that corresponds to region A can be updated to indicate that region A has been modified. If volume 108 is mirrored, the write operation may remain incomplete after the write has been performed to one, but not all, or the mirrors. In such a situation, dirty region log 114 indicates that region A is potentially out-of-sync between different mirrors (the mirrors are out-of-sync if different mirrors may have different values of the same region). Once the mirrors have been updated to have the same value of region A (under normal circumstances, this can be done by applying the write operation to each of the other mirror(s)), the portion dirty region log 114 that corresponds to region A can be reset, so that region A is no longer identified as having been modified or potentially out-of-sync.

Dirty region log 114 is stored on a persistent storage device so that if a failure occurs before all mirrors have been synchronized to reflect an update to volume 108, the information in dirty region log 114 can be used to synchronize only the potentially out-of-sync regions (as opposed to all of the regions) of the mirrors after the failure. Data within dirty region log 114 may be discarded or reset as soon as an associated update has been applied to all mirror data volumes. Dirty region log 114 can be maintained but not utilized for mirror recovery (e.g., in situations in which volume 108 is not mirrored). In some embodiments, a separate dirty region log is maintained for each volume (or each mirrored volume).

Typically, instead of resetting dirty region log 114 on a bit-by-bit basis (or other basis, such as a region-by-region basis or a per-I/O basis), dirty region log 114 is updated at certain intervals, such that any portions of dirty region log 114 that identify modifications to volume 108 at the end of such an interval are reset at substantially the same time. For example, a mirror resynchronization process can operate to ensure that each region of volume 108 that dirty region log 114 identifies as being potentially out-of-sync among the mirrors is in fact synchronized (i.e., that all mirrors have the same value of each region identified in dirty region log 114). Once that process completes, dirty region log 114 can be reset to a value that indicates that no regions of volume 108 are potentially out-of-sync among the mirrors.

Unlike dirty region log 114, the change tracking maps in each copy-on-write snapshot contain data which needs to be retained following the completion of an associated update to a data volume (e.g., a primary data volume, secondary replica data volume, mirror data volume, snapshot data volume, or the like). For example, while dirty region log 114 can be reset after mirrors have been synchronized, change tracking map 116(1) needs to be maintained as long as copy-on-write snapshot 112(1) is in existence. Like the dirty region log 114, change tracking maps 116(1)-116(N) need to identify regions of volume 108 that have been modified (as noted above, each change tracking map identifies regions of volume 108 that have been modified subsequent to the creation of a respective copy-on-write snapshot).

Dirty region log 114 is updated each time that volume 108 is modified. Typically, an operation that modifies volume 108 will not complete until dirty region log 114 has been updated to reflect the modification. Change tracking maps 116(1)-116(N) in copy-on-write snapshots 112(1)-112(N) are also updated to reflect modifications to volume 108. However, change tracking maps 116(1)-116(N) are updated based on values stored in dirty region log 114 (as opposed to being updated synchronously as part of each operation that modifies volume 108). Instead of requiring that completion of an operation that modifies volume 108 be delayed until both dirty region log 114 and all of the change tracking maps in copy-on-write snapshots 112(1)-112(N) have been updated, the change tracking map within each copy-on-write snapshot 112(1)-112(N) of volume 108 can be updated based on information in the dirty region log at a later time (after completion of the operation that modified volume 108). Accordingly, using dirty region log 114 to update change tracking maps 116(1)-116(N) can provide improved application performance by allowing writes to complete before all change tracking maps have been updated and reducing the overhead associated with the updating of N change tracking maps for every write operation.

Figure 2:
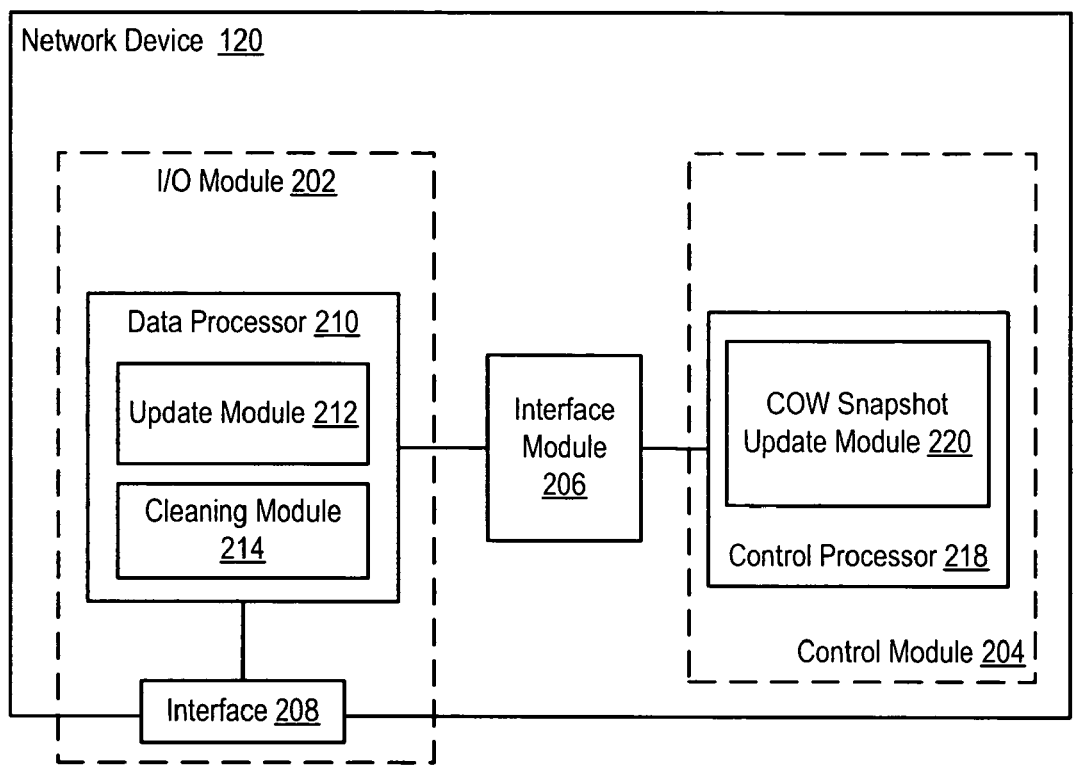
FIG. 2 is a block diagram of a network device, according to one embodiment of the present invention.

FIG. 2 illustrates a block-level diagram of a network device 120. Network device 120 includes an I/O (Input/Output) 202 (also referred to as a data module) and a control module 204. I/O module 202 is coupled to control module 204 by an interface module 206. I/O module 202 processes input/output (I/O) transactions, such as updates or write operations to storage system 104 (as shown in FIG. 1). Control module 204 performs more complex tasks, such as establishing data structures and mapping constructs used by I/O module 202, handling errors, exceptions, interrupts, faults, or the like generated or indicated by I/O module 202, and providing higher-level storage application functionality (e.g., replication, backup, or the like).

I/O module 202 includes an interface 208, which receives and transmits data (e.g., data associated with I/O transactions and requests to perform additional operations) and one or more data processors, such as a data processor 210. Data processor 210 includes an update module 212 and a cleaning module 214. A "module" may include hardware, firmware, software, or any combination thereof.

Update module 212 monitors interface 208 in order to detect each I/O transaction that modifies data within a data volume. In response to detecting a modification to a data volume, update module 212 updates an appropriate dirty region log for that data volume. If the dirty region log is maintained as a bitmap, for example, update module 212 can update the dirty region log by setting a bit corresponding to the region of the data volume that is being modified. In some embodiments, a separate dirty region log is maintained for each data volume that is accessed via network device 120.

Accordingly, a dirty region log can be maintained by I/O module 202, without the involvement of control module 204. In some embodiments, handling updates to the dirty region log in I/O module 202 provides better performance than if control module 204 handled the updates. However, it is noted that, in alternative embodiments, control module 204 can maintain the dirty region log.

Cleaning module 214 "cleans" (e.g., by resetting) one or more bits of each dirty region log. Both the frequency with which the cleaning is performed and the selection of bits for cleaning may be dynamically or statically determined using any of a variety of algorithms or techniques. Cleaning can be performed in a routine manner (e.g., periodically; in response to certain stimuli, such as the number of potentially out-of-sync regions identified in the dirty region log exceeding a threshold number; or the like).

Before cleaning module 214 performs a cleaning operation, cleaning module 214 can first provide a signal or other indication from I/O module 202 to control module 204 via interface module 206. The signal indicates that cleaning module 214 is about to perform a dirty region log cleaning operation and that a potential loss of change tracking information may occur. In response to detecting the first signal, control module 204 can access information stored in the dirty region log that is about to be cleaned and update change tracking map(s) in one or more copy-on-write snapshots based on the information in that dirty region log. In one embodiment, control module 204 accesses the information in the dirty region log by causing I/O module 202 to provide the information to control module 204.

A COW snapshot update module 220 within control processor 218 updates one or more copy-on-write snapshots based on a dirty region log. In one embodiment, COW snapshot update module 220 can perform an update in response to detection of the signal indicating an impending cleaning cycle for a dirty region log. When COW snapshot update module 220 has updated each snapshot's change tracking map based on information in the dirty region log, COW snapshot update module 220 can send another signal or indication to cleaning module 214, in order to notify cleaning module 214 that the cleaning cycle can proceed. In an alternative embodiment, COW snapshot update module 220 can perform a routine update to the change tracking maps, based on information in dirty region log 114, and then send a signal or other indication to cleaning module 214 in order to trigger a cleaning cycle for the dirty region log when the update has completed. Additionally, COW snapshot update module 220 can update a change tracking map, based on the information in the dirty region log, in response to detecting that an application is attempting to access the snapshot that includes the change tracking map (the application's access can be stalled until the change tracking map has been updated).

COW snapshot update module 220 updates one or more change tracking maps based on information in the dirty region log 114. In some embodiments, COW snapshot update module 220 can process and/or analyze the information in the dirty region log in order to determine the update to apply to the change tracking maps. For example, COW snapshot update module 220 can scan the information in the dirty region log for information that identifies potentially out-of-sync regions of the volume. For each region identified as being potentially out-of-sync in the dirty region log, COW snapshot update module 220 can update one or more change tracking maps to indicate that the value of that region is stored in a respective snapshot (as opposed to being stored on the volume itself). For example, if a region A of the volume has been written to subsequent to the most recently performed cleaning cycle, the dirty region log will identify region A as being potentially out-of-sync. When region A is written, the original value of region A is copied to a copy-on-write snapshot. Accordingly, the change tracking map in that copy-on-write snapshot should also indicate that the value of region A is stored in the snapshot, as opposed to being stored in the volume. Thus, based on the information in the dirty region log that identifies region A as being potentially out-of-sync, COW snapshot update module 220 can update the change tracking map in the snapshot to indicate that the value of region A is stored in the snapshot.

In one embodiment, dirty region log 114 and each of the change tracking maps are implemented as bitmaps, in which one bit corresponds to each region of a volume. In such an embodiment, a change tracking map can be updated based on information in the dirty region log by logically combining (e.g., by performing a bitwise logical OR operation) the change tracking map and the dirty region log, and storing the result as the change tracking map. Thus, if the change tracking map includes bits having values 0, 1, 0, 0, and if the values of the same bits of dirty region log are 1, 0, 0, 0, the value of those bits in the updated change tracking map will be 1, 1, 0, 0. In one embodiment, at least those bits of the dirty region log that are to be cleaned in the impending cleaning operation are logically combined with the change tracking map. In other embodiments, the entire dirty region log is logically combined with the change tracking map.

In one embodiment, data processor 210 includes an ASIC and/or a proprietary architecture processor or processor core such as an Advanced RISC Machines (ARM) processor core provided by ARM Ltd of Cambridge, England. In alternative embodiments, data processor 210 includes other specialized hardware, such as programmable logic devices or generalized hardware, in combination with software. In one embodiment, control processor 218 can be implemented in software.

While the above example shows a situation in which data processor 210 updates a dirty region log and a separate control processor 218 uses the dirty region log to update one or more change tracking maps, other embodiments can be implemented differently. For example, in one embodiment, all of the processing needed to both update the dirty region log and update one or more change tracking maps based on information in the dirty region log is performed at interface 208, by a data processor such as data processor 210 of FIG. 2. In such an embodiment, I/O module 202 can include both update module 212 (which updates a dirty region log) and COW snapshot update module 220 (which updates a COW snapshot change tracking map based on information in the dirty region log).

Figure 3:
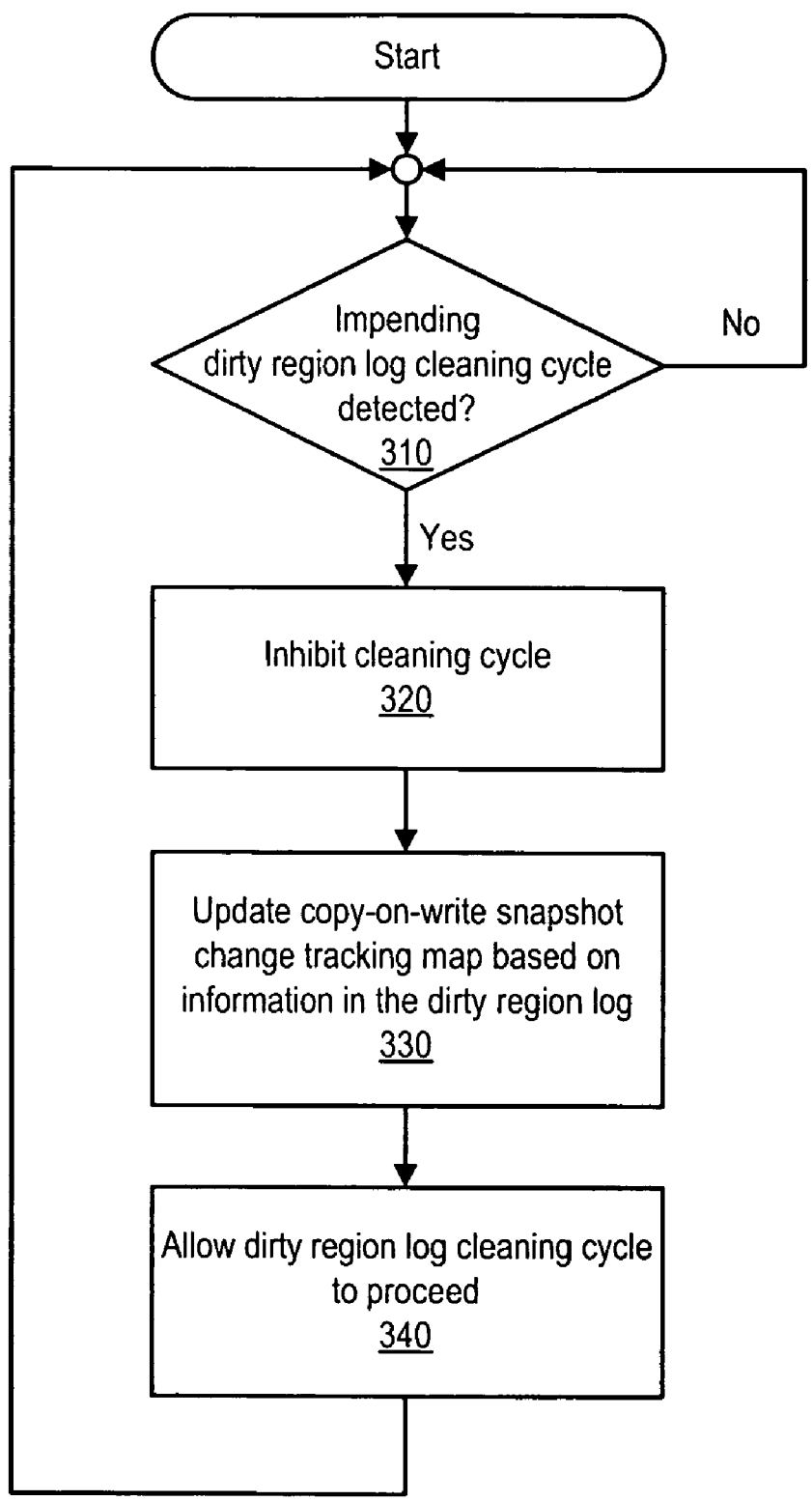
FIG. 3 is a flowchart of a method of updating a copy-on-write snapshot based on a dirty region log, according to one embodiment of the present invention.

FIG. 3 illustrates a method of handling dirty region log cleaning cycles. This method can be performed by a device, such as network device 120, that maintains a dirty region log and uses the dirty region log to update a copy-on-write snapshot. In particular, this method can be performed by a control module such as control module 204.

At 310, an impending dirty region log cleaning cycle is detected. A dirty region log cleaning cycle is "impending" when the dirty region log cycle has been scheduled for completion (e.g., when the dirty region log has been scheduled for imminent completion), but has not yet been performed. An impending dirty region log cleaning cycle can be delayed while one or more change tracking maps (for use in copy-on-write snapshots) are updated based on the pre-cleaning cycle value of the dirty region log. An impending dirty region log cleaning cycle can be detected, for example, in response to signal or other communication generated by an I/O module 202 such as the one illustrated in FIG. 2.

At 320, performance of the impending cleaning cycle is inhibited. Inhibiting the cleaning cycle involves preserving the value of the pre-cleaning cycle value of the dirty region log.

A copy-on-write snapshot change tracking map is updated based on the value of the dirty region log, as shown at 330. As noted above, such an update can involve performing a bitwise logical OR between the change tracking map and the dirty region log. The dirty region log and the change tracking map both correspond to the same volume. If there are multiple copy-on-write snapshots of that volume, performance of function 330 can involve updating multiple change tracking maps based on information in the dirty region log. Once the change tracking map of the copy-on-write snapshot (or each of several change tracking maps, if there are multiple copy-on-write snapshots of the same volume) has been updated based on information in the dirty region log, the dirty region log cleaning cycle is allowed to proceed, as indicated at 340.

While FIG. 3 shows an embodiment in which one or more change tracking maps are updated, based on a dirty region log, in response to detecting an impending dirty region log cleaning cycle, it is noted that other embodiments may operate differently. For example, instead of triggering an update to a change tracking map in response to detecting an impending cleaning cycle, updates to the change tracking map can be performed routinely (e.g., in a routine manner, such as at the expiration of prespecified periods or in response to certain stimuli). Each time the update to the change tracking map (or a set of change tracking maps) completes, a dirty region log cleaning cycle can be triggered.

Figure 4:
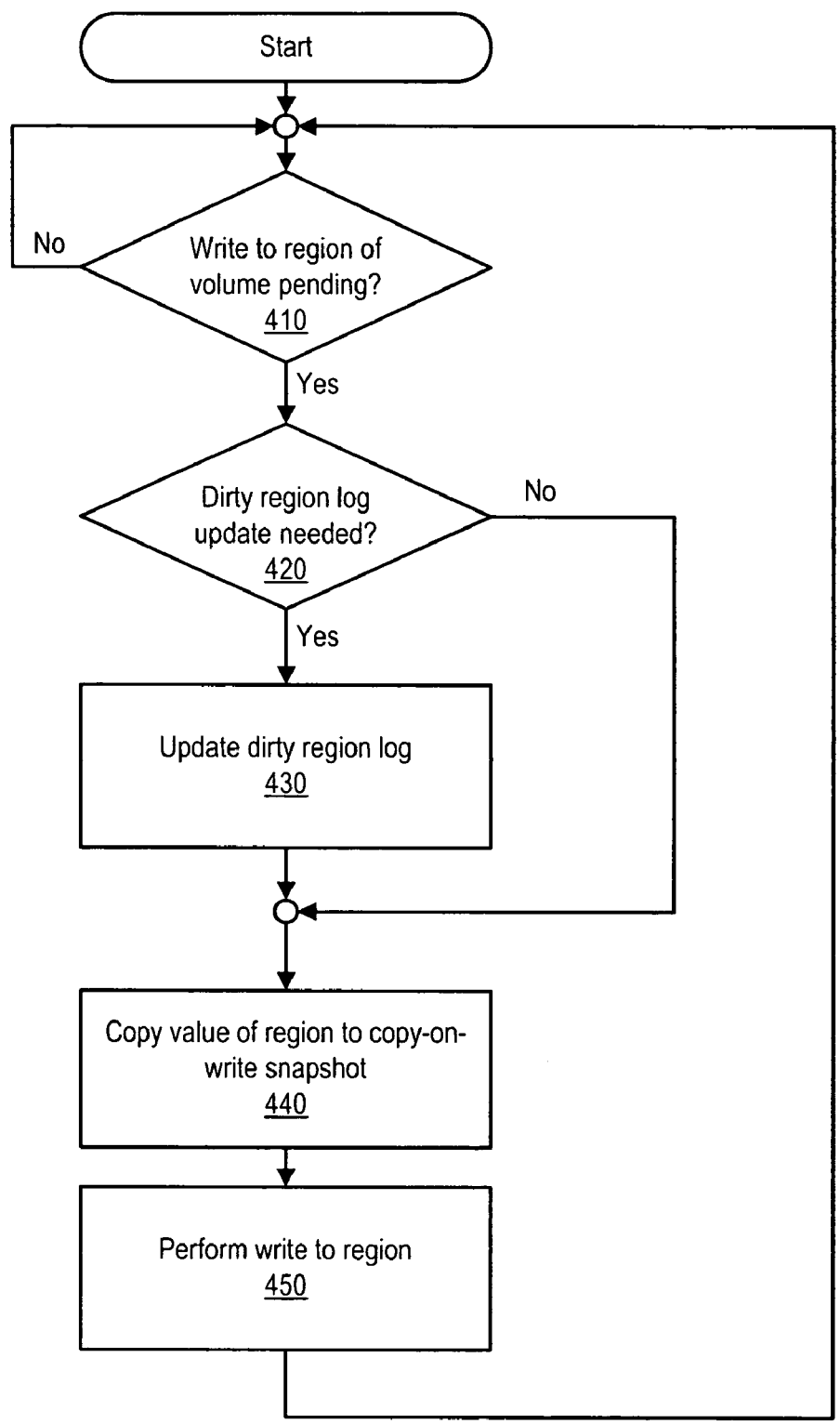
FIG. 4 is a flowchart of a method of performing a modification to a data volume, according to one embodiment of the present invention.

FIG. 4 illustrates a method of performing a modification to a volume. In this example, the modification is performed in response to a write operation. The method of FIG. 4 can be performed by a device such as network device 120 of FIGS. 1 and 2. In particular, the method of FIG. 4 can be performed by an I/O module 202, such as the one shown in FIG. 2.

At 410, a pending write to a region of the volume is detected. If a dirty region log update is needed (i.e., if the dirty region log does not already identify that region of the volume as having been modified), the dirty region log is updated, as indicated at 420 and 430. Updating the dirty region log can involve setting one or more bits associated with the region of the volume to a value that identifies that region as having been modified.

Before the write operation is performed to the region of the volume, the value of the region is copied to a copy-on-write snapshot, as indicated at 440. However, a change tracking map included in the copy-on-write snapshot is not updated at this time (instead, the change tracking map is updated at a later time based on information in the dirty region log). Once the value of the region has been copied to the copy-on-write snapshot, the write is performed, as indicated at 450. It is noted that without a dirty region log for the volume, the copy-on-write change tracking map(s) would have to be updated synchronously (e.g., before completion of the write) for each write operation that affects a previously unmodified region of the volume.

Figure 5:
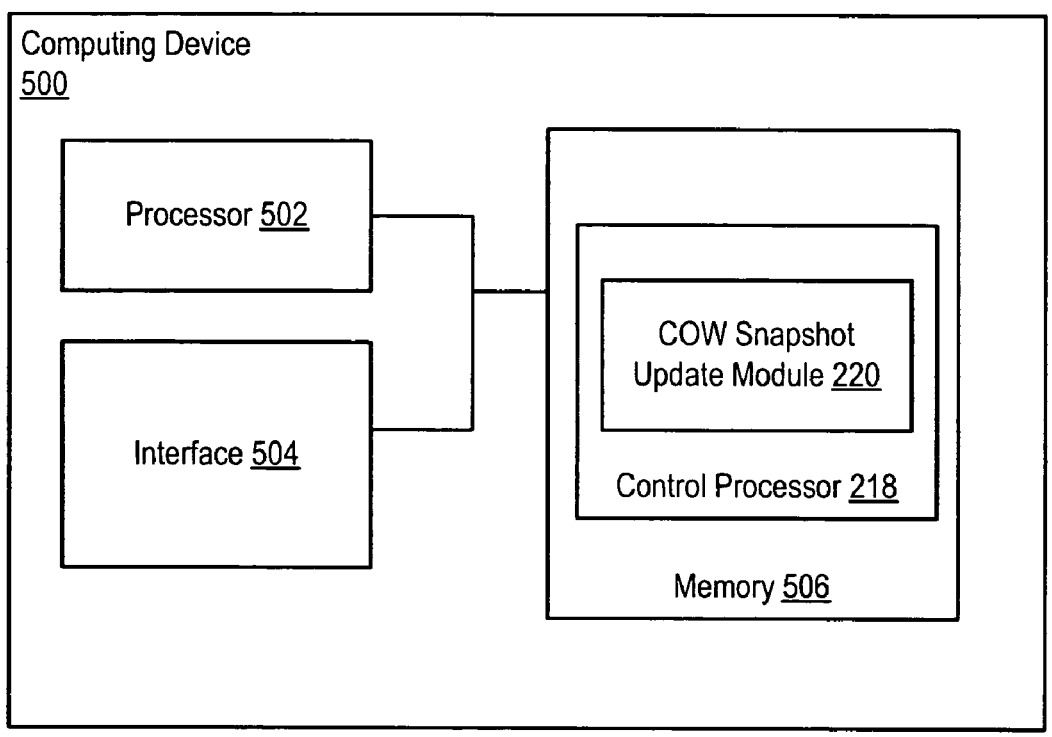
FIG. 5 is another block diagram of a network device, according to one embodiment of the present invention.

FIG. 5 illustrates a block diagram of a computing device 500 that updates a copy-on-write snapshot based on a dirty region log. In one embodiment, computing device 500 is a network device such as network device 120 of FIGS. 1 and 2.

Computing device 500 includes one or more processors 502, an I/O interface 504 (e.g., to a storage system), and a memory 506. FIG. 5 illustrates how control processor 218, which includes COW snapshot update module 220 (as shown in FIG. 2), can be implemented in software. As illustrated, computing device 500 includes one or more processors 502 (e.g., microprocessors, PLDs (Programmable Logic Devices), or ASICs (Application Specific Integrated Circuits)) configured to execute program instructions stored in memory 506. Memory 506 can include various types of RAM (Random Access Memory), ROM (Read Only Memory), Flash memory, MEMS (Micro Electro-Mechanical Systems) memory, and the like. Computing device 500 also includes one or more interfaces 504. In one embodiment, interface 504 includes I/O module 202 of FIG. 2. Processor 502, interface 504, and memory 506 are coupled to send and receive data and control signals by a bus or other interconnect.

Interface(s) 504 can include an interface to a storage system (e.g., such as storage system 104 of FIG. 1) on which one or more volumes and copy-on-write snapshots are implemented. Such a storage system can also store one or more dirty region logs.

The program instructions and data implementing control processor 218 can be stored on various computer readable media such as memory 506. In some embodiments, data protection utility software is stored on a computer readable medium such as a CD (Compact Disc), DVD (Digital Versatile Disc), hard disk, optical disk, tape device, floppy disk, and the like. In order to be executed by processor 502, the instructions and data implementing control processor 218 are loaded into memory 506 from the other computer readable medium. The instructions and/or data implementing control processor 218 can also be transferred to computing device 500 for storage in memory 506 via a network such as the Internet or upon a carrier medium. In some embodiments, a computer readable medium is a carrier medium such as a network and/or a wireless link upon which signals such as electrical, electromagnetic, or digital signals, on which the data and instructions implementing control processor 218 are encoded, are conveyed.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   accessing information in a dirty region log;
   updating a copy-on-write snapshot change tracking map, based on the information in the dirty region log, wherein the updating is performed in response to an indication of a dirty region log cleaning cycle; and
   inhibiting the dirty region log cleaning cycle until after the copy-on-write snapshot change tracking map has been updated based on the information in the dirty region log.

2. The method of claim 1, wherein
   the accessing and the updating are performed by a virtualizing network device.

3. The method of claim 2, further comprising:
   updating a plurality of copy-on-write snapshot change tracking maps, based on the information in the dirty region log, wherein
      each of the copy-on-write snapshot change tracking maps is associated with a respective one of a plurality of copy-on-write snapshots.

4. The method of claim 3, wherein
   the updating is performed subsequent to completion of a write operation to a volume, and
   the method further comprises updating the dirty region log in response to the write operation.

5. The method of claim 4, further comprising:
   copying a value of a region to a copy-on-write snapshot, in response to the write operation; and
   performing the write operation to the region, subsequent to the copying, wherein the region stores a new value subsequent to the performing.

6. A network device comprising:
   an I/O module;
   a control module;
   a dirty region log update module configured to maintain a dirty region log, wherein the I/O module comprises the dirty region log module; and
   a change tracking map update module coupled to the dirty region log update module, wherein
      the change tracking map update module is configured to update a copy-on-write snapshot change tracking map, based on information in the dirty region log, in response to receiving notification of a dirty region log cleaning cycle.

7. The network device of claim 6, wherein the control module comprises the change tracking map update module.

8. The network device of claim 6, wherein
   the change tracking map update module is configured to inhibit the dirty region log cleaning cycle until after the copy-on-write snapshot change tracking map has been updated based on the information in the dirty region log.

9. The network device of claim 8, wherein
   the change tracking map update module is configured to update a plurality of copy-on-write snapshot change tracking maps, based on the information in the dirty region log, wherein
      each of the copy-on-write snapshot change tracking maps is associated with a respective one of a plurality of copy-on-write snapshots.

10. A computer readable storage medium comprising program instructions executable to:
    access information in a dirty region log;
    update a copy-on-write snapshot change tracking map, based on the information in the dirty region log, in response to an indication of a dirty region log cleaning cycle; and
    inhibit the dirty region log cleaning cycle until after the copy-on-write snapshot change tracking map has been updated.

11. The computer readable storage medium of claim 10, wherein the program instructions are executable to update a plurality of copy-on-write snapshot change tracking maps, based on the information in the dirty region log, wherein
       each of the copy-on-write snapshot change tracking maps is associated with a respective one of a plurality of copy-on-write snapshots.

12. The computer readable storage medium of claim 10, wherein
    the program instructions are executable to update the copy-on-write snapshot change tracking map subsequent to completion of a write operation to a volume, and
    the program instructions are executable to update the dirty region log in response to the write operation.

13. The computer readable storage medium of claim 12, wherein the program instructions are further executable to:
    copy a value of a region to a copy-on-write snapshot, in response to the write operation; and
    perform the write operation to the region, subsequent to the copying, wherein the region stores a new value subsequent to the performing.

14. A system comprising:
    a processor; and
    a memory coupled to the processor and configured to store program instructions executable by the processor to:
    access information in a dirty region log;
    update a copy-on-write snapshot change tracking map, based on the information in the dirty region log, in response to an indication of a dirty region log cleaning cycle; and
    inhibit the dirty region log cleaning cycle until after the copy-on-write snapshot change tracking map has been updated.

15. The system of claim 14, wherein the program instructions are executable to update a plurality of copy-on-write snapshot change tracking maps, based on the information in the dirty region log, wherein
    each of the copy-on-write snapshot change tracking maps is associated with a respective one of a plurality of copy-on-write snapshots.

* * * * *